United States Patent
Murata et al.

(10) Patent No.: US 8,837,261 B1
(45) Date of Patent: Sep. 16, 2014

(54) ELECTRICAL CONTACT FOR AN ENERGY-ASSISTED MAGNETIC RECORDING LASER SUB-MOUNT

(71) Applicant: HGST Netherlands B.V., Amsterdam (NL)

(72) Inventors: Kenichi Murata, Ebina (JP); Tatsumi Tsuchiya, Ayase (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/011,468

(22) Filed: Aug. 27, 2013

(51) Int. Cl.
*G11B 11/00* (2006.01)
*G11B 5/48* (2006.01)
*G11B 13/04* (2006.01)

(52) U.S. Cl.
CPC ............ *G11B 5/4866* (2013.01); *G11B 13/045* (2013.01)
USPC ................... 369/13.32; 369/13.13; 360/264.2

(58) Field of Classification Search
None
See application file for complete search history.

(56) References Cited

U.S. PATENT DOCUMENTS

| | | | |
|---|---|---|---|
| 4,092,614 A | 5/1978 | Sakuma et al. | |
| 6,188,707 B1 | 2/2001 | Irwin et al. | |
| 6,404,706 B1 | 6/2002 | Stovall et al. | |
| 6,523,250 B2 | 2/2003 | Erpelding et al. | |
| 7,974,043 B2 * | 7/2011 | Shimazawa et al. | 369/13.33 |
| 8,023,226 B2 * | 9/2011 | Shimazawa et al. | 360/125.74 |
| 8,184,507 B1 | 5/2012 | Hirano et al. | |
| 8,220,140 B1 * | 7/2012 | Wang et al. | 29/737 |
| 8,240,545 B1 * | 8/2012 | Wang et al. | 228/123.1 |
| 8,243,561 B2 | 8/2012 | Matsumoto | |
| 8,288,204 B1 * | 10/2012 | Wang et al. | 438/107 |
| 8,295,010 B2 * | 10/2012 | Shimazawa et al. | 360/125.31 |
| 8,300,503 B2 | 10/2012 | Arai et al. | |
| 8,462,462 B1 * | 6/2013 | Moravec et al. | 360/125.31 |
| 8,518,749 B2 * | 8/2013 | Dahilig et al. | 438/122 |
| 2005/0141579 A1 | 6/2005 | Yamane et al. | |
| 2009/0039505 A1 | 2/2009 | Hirano et al. | |
| 2012/0008233 A1 | 1/2012 | Hirano et al. | |
| 2012/0320719 A1 | 12/2012 | Arai et al. | |
| 2013/0277863 A1 * | 10/2013 | Zhong et al. | 257/779 |
| 2013/0322822 A1 * | 12/2013 | Roeger et al. | 385/36 |

FOREIGN PATENT DOCUMENTS

| | | |
|---|---|---|
| EP | 1635624 A2 | 3/2006 |
| JP | 11-097146 | 4/1999 |
| JP | 2008-059695 | 3/2008 |
| JP | 2012-119049 | 6/2012 |

* cited by examiner

*Primary Examiner* — Thang Tran
(74) *Attorney, Agent, or Firm* — John D. Henkhaus

(57) ABSTRACT

Approaches to an electrical contact to electrically connect a laser module and a suspension that houses a head slider, in the context of a hard disk drive, involves a laser sub-mount electrical contact that includes a metal barrier layer underneath an electrode layer, where the barrier layer material has a lower heat transfer coefficient than the sub-mount material. Consequently, during the soldering process the diffusion of heat to the sub-mount is inhibited and the wettability of the solder is improved.

18 Claims, 4 Drawing Sheets

ELECTRICAL CONTACT FOR AN ENERGY-ASSISTED MAGNETIC RECORDING LASER SUB-MOUNT

FIELD OF THE INVENTION

Embodiments of the invention relate generally to hard disk drives and more particularly to an electrode design for soldering on a material having high thermal conductivity.

BACKGROUND

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head, which is housed in a slider, and the surface of a magnetic-recording disk must be tightly controlled. An actuator relies in part on a suspension's force on the slider and on the aerodynamic characteristics of the slider air bearing surface (ABS) to provide the proper distance between the read/write head and the surface of the magnetic-recording disk (the "flying height") while the magnetic-recording disk rotates. A slider therefore is said to "fly" over the surface of the magnetic-recording disk.

Increasing areal density (a measure of the quantity of information bits that can be stored on a given area of disk surface) is one of the ever-present holy grails of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of temperature.

Energy-assisted magnetic recording (EAMR) [forms of which may also be referred to as heat-assisted magnetic recording (HAMR) or thermal-assisted magnetic recording (TAR), and microwave-assisted magnetic recording (MAMR)] is a known technology that magnetically records data on high-stability media using, for example, laser thermal assistance to first heat the material. HAMR takes advantage of high-stability, high coercivity magnetic compounds, such as iron platinum alloy, which can store single bits in a much smaller area without being limited by the same superparamagnetic effect that limits the current technology used in hard disk drive storage. However, at some capacity point the bit size is so small and the coercivity correspondingly so high that the magnetic field used for writing data cannot be made strong enough to permanently affect the data and data can no longer be written to the disk. HAMR solves this problem by temporarily and locally changing the coercivity of the magnetic storage medium by raising the temperature above the Curie temperature, at which the medium effectively loses coercivity and a realistically achievable magnetic write field can write data to the medium.

One approach to HAMR designs is to utilize a laser diode to heat the media to lower its coercivity. However, implementation of a laser diode close enough to the magnetic write head to be effective poses its own challenges.

SUMMARY OF EMBODIMENTS OF THE INVENTION

Embodiments of the invention are directed to electrically connecting a semiconductor laser module and a suspension that houses a head slider, in the context of a hard disk drive (HDD).

According to an embodiment, an energy-assisted magnetic recording (EAMR) assembly comprises a semiconductor laser module coupled with a suspension, where each of the suspension and a semiconductor laser sub-mount comprises respective electrical contacts used for fabricating an electrically conductive solder joint. Notably, the sub-mount electrical contact includes a metal barrier layer underneath an electrode layer, where the barrier layer material has a lower heat transfer coefficient than the sub-mount material. Consequently, during the soldering process the diffusion of heat to the sub-mount is inhibited and reduced, and the wettability of the solder is improved, thereby enabling a more robust and effective bond between the components.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to configuration and use of an electrical contact for a semiconductor laser sub-mount, in the context of an energy-assisted magnetic recording assembly for a hard-disk drive, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

PHYSICAL DESCRIPTION OF ILLUSTRATIVE EMBODIMENTS OF THE INVENTION

Figure 1:
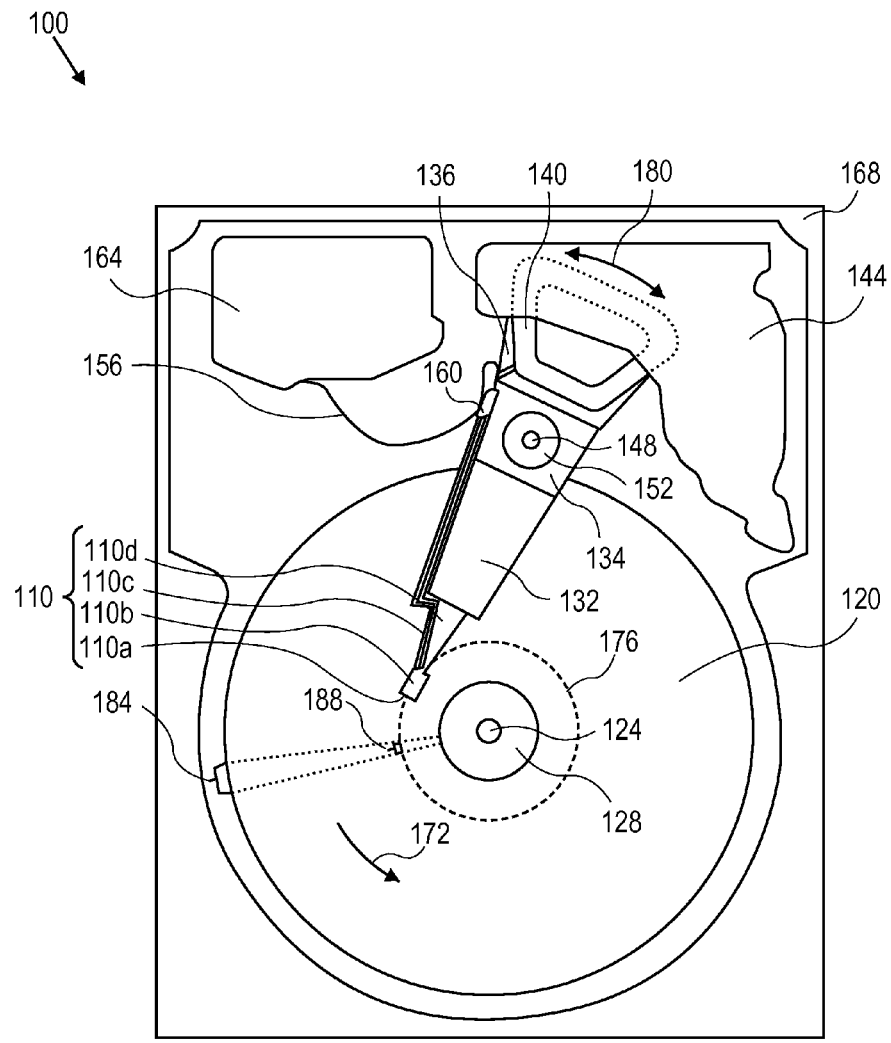
FIG. 1 is a plan view of an HDD, according to an embodiment of the invention.

Embodiments of the invention may be used in the context of a hard-disk drive (HDD). In accordance with an embodiment of the invention, a plan view of a HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the disk 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of stacked tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

INTRODUCTION

As mentioned, an approach to HAMR designs is to utilize a semiconductor laser to heat the media to lower its coercivity to assist in the recording/writing process. In order to fabricate an electrical junction between a semiconductor laser module (i.e., a semiconductor laser mounted on a sub-mount structure) and a suspension on which the semiconductor laser module is mounted, typically a solder junction using a solder ball jet process is formed. However, the heat transfer coefficient of the sub-mount material is typically relatively large, thus the soldering of the sub-mount to the suspension poses certain challenges, as follows.

With solder electrical junctions, melting solder contacts an electrode whereby gold (or other electrode material) dissolves in the melting solder and the solder joint is formed by forming an alloy. In order for the sub-mount to radiate the heat produced by the semiconductor laser during operation, a material having a high heat transfer coefficient such as AN or Si may be used. Therefore, the temperature of the melting solder falls for an initial period of time due to the significant heat transfer to the high heat transfer sub-mount material and, thus, the solder tends to solidify. Consequently, an alloy layer does not fully form or is not formed at all, and this situation is characterized as bad wettability of the solder.

Figure 2:
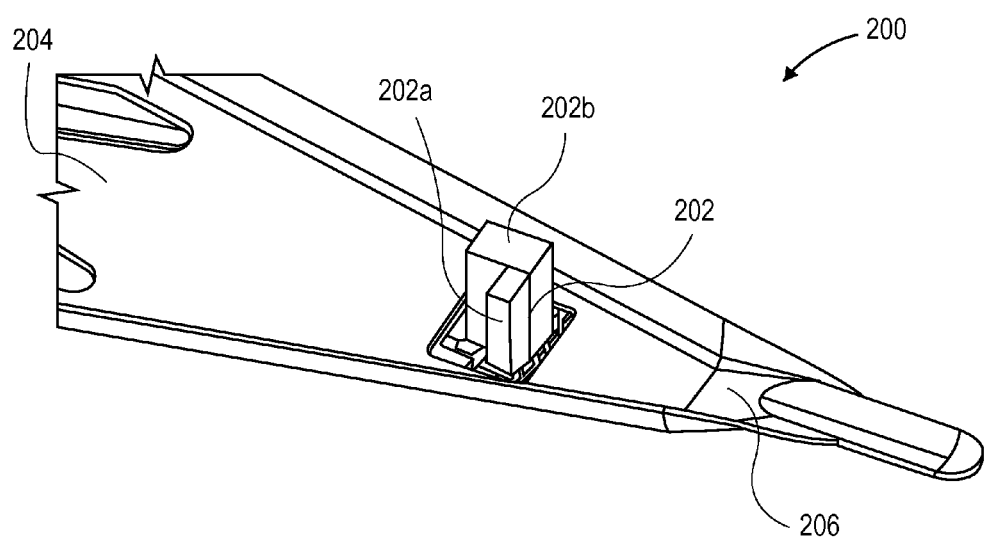
FIG. 2 is a partial perspective view of a semiconductor laser module mounted on a suspension, according to an embodiment of the invention.

FIG. 2 is a partial perspective view of a semiconductor laser module mounted on a suspension, according to an embodiment of the invention. FIG. 2 illustrates an assembly 200 in which semiconductor laser module 202, comprising a semiconductor laser 202a and a sub-mount 202b, is attached to a suspension 204.

An HDD includes at least one head gimbal assembly (HGA) that includes a slider that houses the read/write head, and a suspension such as suspension 204. Each slider is attached to the free end of a suspension that in turn is cantilevered from the rigid arm of an actuator. Several semi-rigid arms may be combined to form a single movable unit, a head stack assembly (HSA), having either a linear bearing or a rotary pivotal bearing system. The suspension 204 typically includes a relatively stiff load beam 206 with a mount plate at the base end, which subsequently attaches to the actuator arm, and whose free end mounts a flexure that carries the slider and its read/write head.

For a HAMR design, laser sub-mount 202b is coupled to a portion of the suspension 204. According to an embodiment, laser sub-mount 202b is electrically connected to suspension 204 via an electrically conductive solder junction, e.g., using a solder ball jet process as is known in the art. As such, the sub-mount 202b comprises an electrical contact that is solder joined with an electrical contact on the suspension 204. However, because of the high heat transfer coefficient of the material used to fabricate laser sub-mount 202b, and its corresponding propensity for inhibiting a good solder junction by way of its high heat transfer away from the electrical contact pad, a non-conventional electrical contact pad (also referred to as an electrode) is utilized to ensure a robust, effective solder junction.

Soldering Electrode for High Thermal Conductivity Materials

Figure 3:
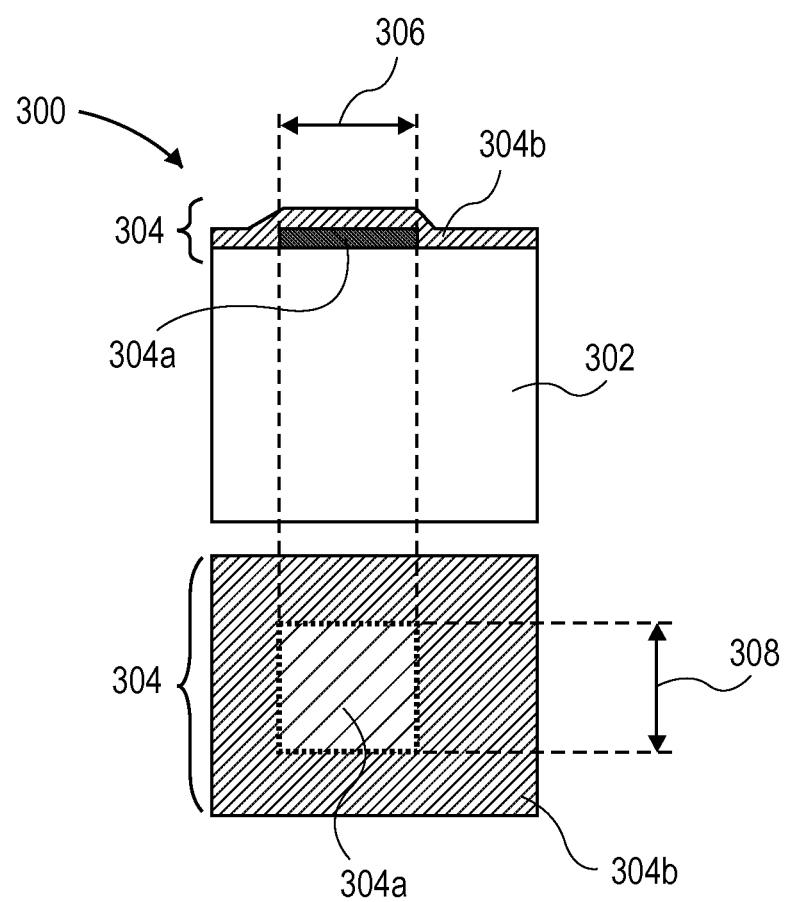
FIG. 3 is a side view and a plan view block diagram illustrating an electrical contact, according to an embodiment of the invention.

FIG. 3 is a side view and a plan view block diagram illustrating an electrical contact, according to an embodiment of the invention. FIG. 3 illustrates an assembly 300 comprising a sub-mount 302 of a semiconductor laser module, such as sub-mount 202b (FIG. 2) of semiconductor laser module 202 (FIG. 2), including an electrical contact 304.

Sub-mount electrical contact 304 comprises a barrier layer 304a on top of which is an electrode layer 304b. In order to inhibit or reduce the transfer of heat from the melting solder ball during the soldering process, barrier layer 304a comprises a material having a relatively low heat transfer coefficient in comparison with the heat transfer coefficient of the material of sub-mount 302. For example, sub-mount 302 may comprise AN and, according to an embodiment, the barrier layer 304a comprises $SiO_2$. Furthermore, barrier layer 304a is formed between the material of sub-mount 302 and the material of electrode layer 304b (which may comprise, for example, one or more of Ti, Pt, Au). According to an embodiment, the barrier layer 304a is in direct contact with the sub-mount 302, as illustrated in FIG. 3.

According to an embodiment, barrier layer 304a comprises a metal. Further, according to embodiments, barrier layer 304a comprises one of TaN, $SiO_2$, or $Al_2O_3$, respectively. Still further, according to embodiments, barrier layer 304a consists of one of TaN, $SiO_2$, or $Al_2O_3$, respectively.

The plan view of FIG. 3 (lower diagram) illustrates a general shape of, and dimensions of, the barrier layer 304a. According to an embodiment, barrier layer 304a is substantially quadrilateral shaped, generally, and substantially rectangular shaped, specifically. The following dimensions of barrier layer 304a have been found to produce good electrical solder junctions, e.g., good solder wettability due to maintaining an effective temperature of solder and electrical contact materials during the soldering process, in the context of soldering a semiconductor laser sub-mount such as sub-mount 202b (FIG. 2) to a suspension such as suspension 204 (FIG. 2). However, this shape and these dimensions may vary from implementation to implementation based on, for example, the barrier layer material, the electrode layer material, the sub-mount material, and the solder material used, as well as other design-specific characteristics and conditions.

According to an embodiment, the barrier layer 304a width 306 and the barrier layer 304a height 308 lie in the range of 0.6 to 1.6 times the diameter (e.g., the maximum) of the solder ball used to create the solder joint that electrically connects the semiconductor laser module 202 (FIG. 2) to the suspension 204 (FIG. 2). Such a size of barrier layer 304a provides good solder wettability due to maintaining an effective temperature of solder and electrical contact materials during the soldering process.

Research comparing the solder contact angle (at the point of solder ball's outer surface contact with the sub-mount) relative to the barrier layer thickness, with solder contact angles of 90 degrees or less enabling wet solder, has shown that a certain range of barrier layer thickness provides for wet solder. Therefore, according to an embodiment, the thickness of barrier layer 304a lies in the range of 0.35 µm to 10 µm, thereby providing good solder wettability due to maintaining an effective temperature of solder and electrical contact materials during the soldering process.

Overall, the EAMR electrode configuration described in reference to FIG. 3 effectively controls the diffusion of heat to the sub-mount structure and improves the wettability of the solder and, therefore, improves the solder joint that electrically connects a semiconductor laser module to a suspension in an HDD.

Alternative Embodiments of Soldering Electrodes for High Conductivity Materials

Figures 4A, 4B, 4C:
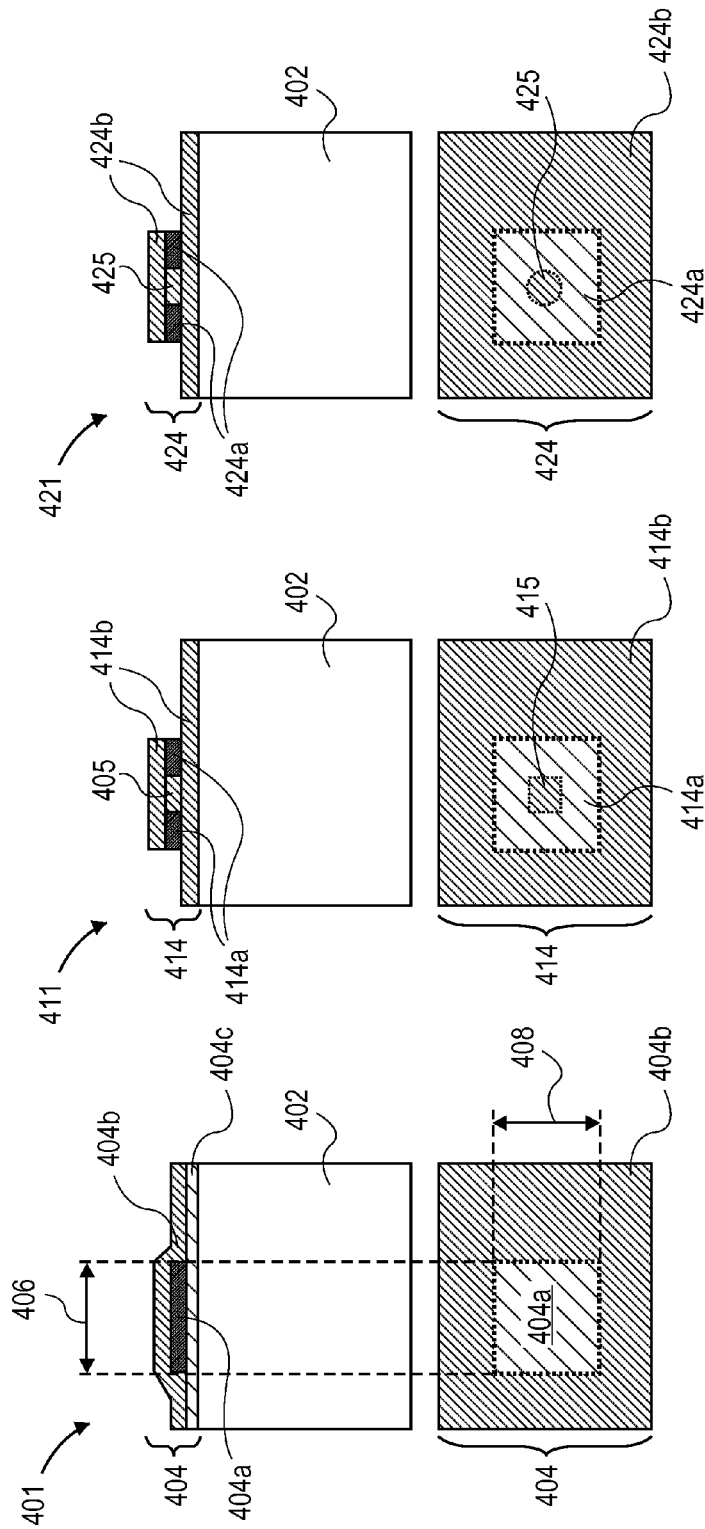
FIG. 4A is a side view and a plan view block diagram illustrating an electrical contact, according to an embodiment of the invention.
FIG. 4B is a side view and a plan view block diagram illustrating an electrical contact, according to an embodiment of the invention.
FIG. 4C is a side view and a plan view block diagram illustrating an electrical contact, according to an embodiment of the invention.

FIG. 4A is a side view and a plan view block diagram illustrating an electrical contact, according to an embodiment of the invention. FIG. 4A illustrates an assembly 401 comprising a sub-mount 402 of a semiconductor laser module, such as sub-mount 202b (FIG. 2) of semiconductor laser module 202 (FIG. 2), including an electrical contact 404.

As with the embodiment illustrated in FIG. 3, sub-mount electrical contact 404 comprises a barrier layer 404a on top of which is an electrode layer 404b. The nature and purpose of the barrier layer 404a and the electrode layer 404b is the same as with barrier layer 304a and electrode layer 304b of FIG. 3. Thus, in order to inhibit or reduce the transfer of heat from the melting solder ball during the soldering process, barrier layer 404a comprises a material having a relatively low heat transfer coefficient in comparison with the heat transfer coefficient of the material of sub-mount 402. Barrier layer 404a is formed between the material of sub-mount 402 and the material of electrode layer 404b, but in this embodiment there lies an electrode bonding layer 404c positioned between the barrier layer 404a and the sub-mount 402. According to an embodiment, the bonding layer 404c is in direct contact with the sub-mount 302, as illustrated in FIG. 4A. Further, according to an embodiment, the bonding layer 404c consists of Ti.

The plan view of FIG. 4 (lower diagram) illustrates a general shape of, and dimensions of, the barrier layer 404a. As with barrier layer 304a, according to an embodiment barrier layer 304a is substantially quadrilateral shaped, generally, and substantially rectangular shaped, specifically. For the same reasons as with barrier layer 304a of FIG. 3, the barrier layer 404a width 406 and height 408 lie in the range of 0.6 to 1.6 times the diameter (e.g., the maximum) of the solder ball used to create the solder joint that electrically connects the semiconductor laser module 202 (FIG. 2) to the suspension 204 (FIG. 2). Further, the thickness of barrier layer 404a lies in the range of 0.35 µm to 10 µm, thereby providing good solder wettability due to maintaining an effective temperature of solder and electrical contact materials during the soldering process.

FIG. 4B is a side view and a plan view block diagram illustrating an electrical contact, according to an embodiment of the invention. FIG. 4B illustrates an assembly 411 comprising a sub-mount 402 of a semiconductor laser module, such as sub-mount 202b (FIG. 2) of semiconductor laser module 202 (FIG. 2), including an electrical contact 414.

As with the embodiment illustrated in FIG. 3, sub-mount electrical contact 414 comprises a barrier layer 414a on top of which, and underneath of which, is an electrode layer 414b. The nature and purpose of the barrier layer 414a and the electrode layer 414b is the same as with barrier layer 304a and electrode layer 304b of FIG. 3. Thus, in order to inhibit or reduce the transfer of heat from the melting solder ball during the soldering process, barrier layer 414a comprises a material having a relatively low heat transfer coefficient in comparison with the heat transfer coefficient of the material of sub-mount 402.

In this embodiment barrier layer 414a has a quadrilateral shaped opening 415 filled with additional conductive material, such as but not limited to the same material as electrode layer 414b, to further enable a viable electrical connection across the barrier layer 414a.

FIG. 4C is a side view and a plan view block diagram illustrating an electrical contact, according to an embodiment of the invention. FIG. 4C illustrates an assembly 421 comprising a sub-mount 402 of a semiconductor laser module, such as sub-mount 202b (FIG. 2) of semiconductor laser module 202 (FIG. 2), including an electrical contact 424.

As with the embodiment illustrated in FIG. 3, sub-mount electrical contact 424 comprises a barrier layer 424a on top of which, and underneath of which, is an electrode layer 424b. The nature and purpose of the barrier layer 424a and the electrode layer 424b is the same as with barrier layer 304a and electrode layer 304b of FIG. 3. Thus, in order to inhibit or reduce the transfer of heat from the melting solder ball during the soldering process, barrier layer 424a comprises a material having a relatively low heat transfer coefficient in comparison with the heat transfer coefficient of the material of sub-mount 402.

In this embodiment barrier layer 424a has a circular shaped opening 425 filled with additional electrode material, such as the same material as electrode layer 424b, to further enable a viable electrical connection across the barrier layer 424a.

The shape of opening 415 (the embodiment of FIG. 4B) and the shape of opening 425 (the embodiment of FIG. 4C) may vary from implementation to implementation. For example, as long as the upper and lower portions of 414b (FIG. 4B) are electrically connected via opening 415, or the upper and lower portions of 424b (FIG. 4C) are electrically connected via opening 425, then the exact shape implemented for the openings 415 and 425 may vary.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An energy-assisted magnetic recording (EAMR) assembly, comprising:
    a head slider comprising a magnetic write head;
    a suspension configured to support said head slider and comprising a suspension electrical contact; and
    a laser module coupled with said suspension, said laser module comprising:
        a laser, and
        a sub-mount on which said laser is mounted, said sub-mount comprising a sub-mount electrical contact and electrically connected with said suspension via a solder joint electrically connecting said suspension electrical contact and said sub-mount electrical contact; and
    wherein said sub-mount electrical contact comprises an electrode layer over a barrier layer; and
    wherein said barrier layer has a lower heat transfer coefficient than the heat transfer coefficient of said sub-mount.

2. The EAMR assembly of claim 1, wherein said barrier layer is in direct contact with said sub-mount.

3. The EAMR assembly of claim 1, wherein a Ti electrode bonding layer is positioned between said barrier layer and said sub-mount.

4. The EAMR assembly of claim 1, wherein said barrier layer comprises a metal.

5. The EAMR assembly of claim 1, wherein said barrier layer comprises $SiO_2$.

6. The EAMR assembly of claim 1, wherein said barrier layer comprises TaN.

7. The EAMR assembly of claim 1, wherein said barrier layer comprises $Al_2O_3$.

8. The EAMR assembly of claim 1, wherein said barrier layer consists of one from a group consisting of $SiO_2$, TaN, and $Al_2O_3$.

9. The EAMR assembly of claim 1, wherein each of the length and the width of said barrier layer is in a range from 0.6 to 1.6 times the diameter of a solder ball used to create said solder joint.

10. The EAMR assembly of claim 1, wherein the thickness of said barrier layer is in a range from 0.35 µm to 10 µm.

11. The EAMR assembly of claim 1, wherein said barrier layer has an opening filled with a conductive material.

12. A hard disk drive (HDD), comprising:
    a head slider comprising a magnetic write head;
    a suspension configured to support said head slider and comprising a suspension electrical contact;
    a magnetic-recording disk rotatably mounted on a spindle;
    a voice coil motor (VCM) configured to move said suspension and said head slider to access portions of said magnetic-recording disk; and
    a laser module coupled with said suspension, said laser module comprising:
        a laser, and
        a sub-mount on which said laser is mounted, said sub-mount comprising a sub-mount electrical contact and electrically connected with said suspension via a solder joint electrically connecting said suspension electrical contact and said sub-mount electrical contact; and
    wherein said sub-mount electrical contact comprises an electrode layer over a metal barrier layer; and
    wherein said barrier layer has a lower heat transfer coefficient than the heat transfer coefficient of said sub-mount.

13. The HDD of claim 12, wherein said barrier layer is in direct contact with said sub-mount.

14. The HDD of claim 12, wherein said barrier layer comprises at least one from a group consisting of $SiO_2$, TaN, and $Al_2O_3$.

15. The HDD of claim 12, wherein said barrier layer consists of one from a group consisting of $SiO_2$, TaN, and $Al_2O_3$.

16. The HDD of claim 12, wherein each of the length and the width of said barrier layer is in a range from 0.6 to 1.6 times the diameter of a solder ball used to create said solder joint.

17. The HDD of claim 12, wherein the thickness of said barrier layer is in a range from 0.35 μm to 10 μm.

18. The HDD of claim 12, wherein said barrier layer has an opening filled with a conductive material.

* * * * *